(12) United States Patent
Daugherty et al.

(10) Patent No.: US 11,989,584 B2
(45) Date of Patent: May 21, 2024

(54) SYSTEM AND METHOD OF MANAGING RESTARTING CHILD PROCESSES ON INFORMATION HANDLING SYSTEMS

(71) Applicant: Dell Products L.P., Round Rock, TX (US)

(72) Inventors: Daniel Thomas Daugherty, Plano, TX (US); Ricardo Antonio Ruiz, The Colony, TX (US); Jonathan Nathan Yanez, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 441 days.

(21) Appl. No.: 17/452,588

(22) Filed: Oct. 28, 2021

(65) Prior Publication Data

US 2023/0136610 A1    May 4, 2023

(51) Int. Cl.
G06F 9/48        (2006.01)
G06N 3/084      (2023.01)

(52) U.S. Cl.
CPC .......... *G06F 9/4881* (2013.01); *G06N 3/084* (2013.01)

(58) Field of Classification Search
None
See application file for complete search history.

(56) References Cited

U.S. PATENT DOCUMENTS

| | | | | |
|---|---|---|---|---|
| 6,453,430 B1 * | 9/2002 | Singh | ................. | G06F 11/0715 714/E11.023 |
| 6,883,170 B1 * | 4/2005 | Garcia | ................ | G06F 11/1482 718/1 |
| 7,308,690 B2 * | 12/2007 | Brenner | ................ | G06F 9/4843 719/310 |
| 9,021,485 B2 * | 4/2015 | Vanderpool | ......... | G06F 11/1438 718/104 |
| 10,061,631 B2 * | 8/2018 | Zhang | ................. | G06F 11/0793 |
| 10,101,910 B1 * | 10/2018 | Karppanen | ........... | G06F 3/0631 |
| 10,740,185 B2 * | 8/2020 | Zarakowski | ........ | G06F 11/1438 |

(Continued)

OTHER PUBLICATIONS

Laadan et al.; "Transparent Checkpoint-Restart of Multiple Processes on Commodity Operating Systems"; 2007 USENIX Annual Technical Conference; (Laadan_2007.pdf; pp. 323-336) (Year: 2007).*

*Primary Examiner* — Hiren P Patel
(74) *Attorney, Agent, or Firm* — McDermott Will & Emery LLP (57) ABSTRACT

In one or more embodiments, one or more systems, one or more methods, and/or one or more processes may receive, by a parent process of a child process, first information indicating that the child process ceased executing; determine, by an analyzer of the parent process, a reason that the child process ceased executing; determine, by the parent process, a first numerical weight associated with the reason; determine, by the parent process, that the first numerical weight is above a threshold numerical value; restart, by the parent process, execution of the child process; determine, by a loss function, a second numerical weight associated with the reason; receive, by the parent process, second information indicating that the child process has ceased executing; determine, by the analyzer, the reason that the child process ceased executing; and determine, by the parent process, that the second numerical weight is not above the threshold numerical value.

20 Claims, 5 Drawing Sheets

(56) References Cited

U.S. PATENT DOCUMENTS

| | | | |
|---|---|---|---|
| 2003/0037290 A1* | 2/2003 | Price | G06F 9/542 714/38.1 |
| 2007/0168764 A1* | 7/2007 | Simpson | G06F 11/3419 714/57 |
| 2008/0022281 A1* | 1/2008 | Dubhashi | G06F 9/547 718/102 |
| 2019/0065740 A1* | 2/2019 | Van Riel | G06F 21/554 |
| 2019/0163493 A1* | 5/2019 | Dubeyko | G06F 9/5005 |
| 2020/0097364 A1* | 3/2020 | Zarakowski | G06F 9/485 |

* cited by examiner

SYSTEM AND METHOD OF MANAGING RESTARTING CHILD PROCESSES ON INFORMATION HANDLING SYSTEMS

BACKGROUND

Field of the Disclosure

This disclosure relates generally to information handling systems and more particularly to managing restarting child processes on information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may start, by a parent process executing on an information handling system, execution of a child process of the parent process on the information handling system; may receive, by the parent process, first information indicating that the child process has ceased executing on the information handling system; may determine, by at least one analyzer of the parent process, a reason that the child process ceased executing; may determine, by the parent process, a first numerical weight associated with the reason that the child process ceased executing; may determine, by the parent process, that the first numerical weight is above a threshold numerical value; may restart, by the parent process, execution of the child process on the information handling system; may determine, by a loss function of the parent process, a second numerical weight associated with the reason; may receive, by the parent process, second information indicating that the child process has ceased executing on the information handling system; may determine, by the at least one analyzer of the parent process, the reason that the child process ceased executing; may determine, by the parent process, that the second numerical weight is not above the threshold numerical value; and may prohibit, by the parent process, execution of the child process on the information handling system. In one or more embodiments, restarting execution of the child process on the information handling system may be performed in response to determining that the first numerical weight is above the threshold numerical value. In one or more embodiments, prohibiting execution of the child process on the information handling system may be performed in response to determining that the second numerical weight is not above the threshold numerical value.

In one or more embodiments, the at least one analyzer of the parent may be configured to process diagnostic hardware information associated with the child process ceasing executing on the information handling system. For example, to process the diagnostic hardware information associated with the child process ceasing executing on the information handling system, the at least one analyzer of the parent may be further configured to process the diagnostic hardware information from a time before the child process stopped executing to at least one of a time when the child process stopped executing and a time after the child process stopped executing. In one or more embodiments, the at least one analyzer of the parent may be configured to process state information associated with the information handling system. In one or more embodiments, the one or more systems, the one or more methods, and/or the one or more processes may further determine, by a backpropagation process, the second numerical weight associated with the reason. For example, the backpropagation process may include the loss function.

In one or more embodiments, the one or more systems, the one or more methods, and/or the one or more processes may further: provide, by the parent process, the reason that the child process ceased executing to at least one other information handling system via a network; and provide, by the parent process, at least one of the first numerical weight associated with the reason and the second numerical weight associated with the reason via the network. In one or more embodiments, the information handling system may include a volatile memory medium. For example, the one or more systems, the one or more methods, and/or the one or more processes may further store the reason that the child process ceased executing via the volatile memory medium of the information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a parent process may have one or more child processes. For example, a software application may include a parent process and one or more child processes. In one or more embodiments, a parent process may be responsible for maintaining a lifecycle of its one or more child processes. For example, if a child process of a parent process stops executing for any reason, the parent process may determine if the child process should be restarted. For instance, the parent process may be a MICROSOFT® WINDOWS® Service Control Manager. In one or more embodiments, the MICROSOFT® WINDOWS® Service Control Manager may be responsible for lifecycles of WINDOWS® Services registered with the MICROSOFT® WINDOWS® Service Control Manager. For example, if a WINDOWS® Service stops executing the WINDOWS® Service Control Manager may determine if the WINDOWS® Service that stopped executing should be restarted. For instance, recovery options for a framework or solution like the WINDOWS® Service Control Manager may include one or more of take no action, restart a service that stopped executing, restart an information handling system that had been executing the service that stopped executing, and execute an application, among others. In one or more embodiments, a user may configure one or more options for a first time that the service that stopped executing, a second time that the service that stopped executing, and/or a subsequent time that the service that stopped executing. For example, this may treat every time that the service that stopped executing as every other time that the service that stopped executing.

In one or more embodiments, an artificial intelligence may be applied to a child process recovery action taken. For example, a reason that caused a child process to stop executing may be determined. For instance, reasons that may have caused a child process to stop executing may be categorized. In one or more embodiments, weights may be applied to the reasons that may have caused the child process to stop executing. For example, a numerical value associated with a child process that stopped executing may be determined based at least on the weights may be applied to the reasons. If the numerical value is above a threshold, the child process may be restarted. If the numerical value is not above the threshold, the child process may not be restarted.

In one or more embodiments, if the numerical value is above the threshold or if the numerical value is not above the threshold, the weights may be adjusted so that if a child process stops executing in the future, a different action could possibly be taken. For example, an artificial intelligence may determine a different action that could possibly be taken based at least on the weights and readjusting the weights based at least on previously taken actions. For instance, the artificial intelligence may include a machine learning process, such as a neural network process, that may determine a different action that could possibly be taken based at least on the weights and readjusting the weights based at least on previously taken actions. As an example, the machine learning process may learn from previously taken actions to determine one or more different future actions.

Figure 1A:
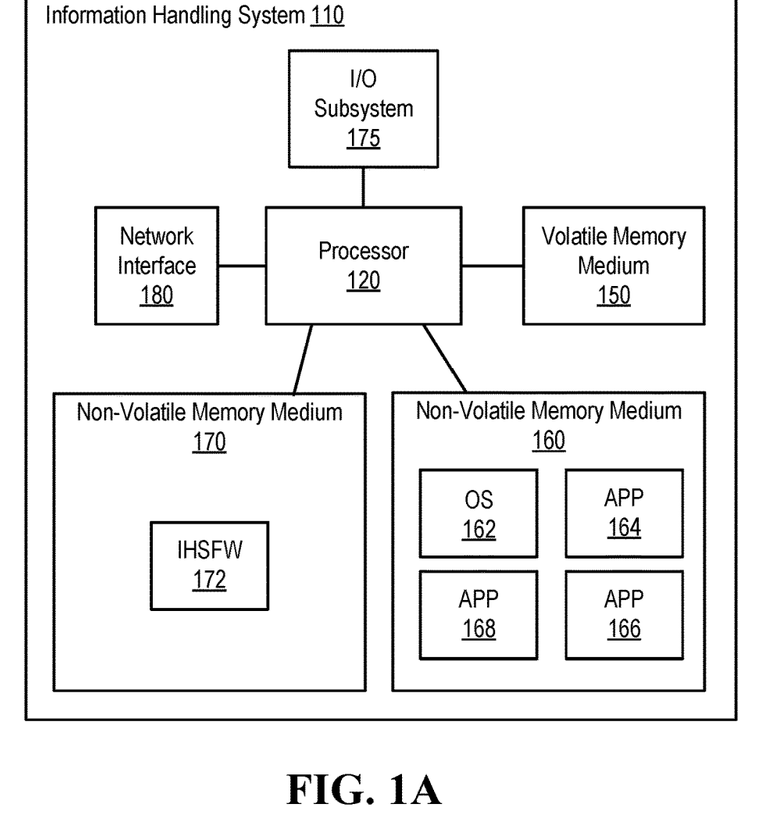
FIG. 1A illustrates an example of an information handling system, according to one or more embodiments.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

Figure 1B:
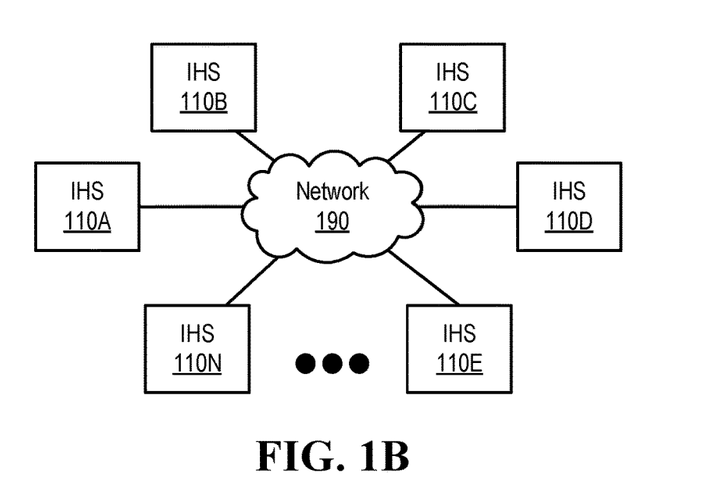
FIG. 1B illustrates an example of multiple information handling systems coupled to a network, according to one or more embodiments.

Turning now to FIG. 1B, an example of multiple information handling systems coupled to a network is illustrated, according to one or more embodiments. In one or more embodiments, information handling systems (IHSs) 110A-110N may be coupled to a network 190. In one or more embodiments, network 190 may include a wired network, a wireless network, an optical network, or a combination of the foregoing, among others. For example, network 190 may include and/or be coupled to various types of communications networks. For instance, network 190 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others. Although FIG. 1B illustrates IHSs 110A-110N coupled to network 190, any number of IHSs 110 may be coupled to network 190, according to one or more embodiments.

Figure 2A:
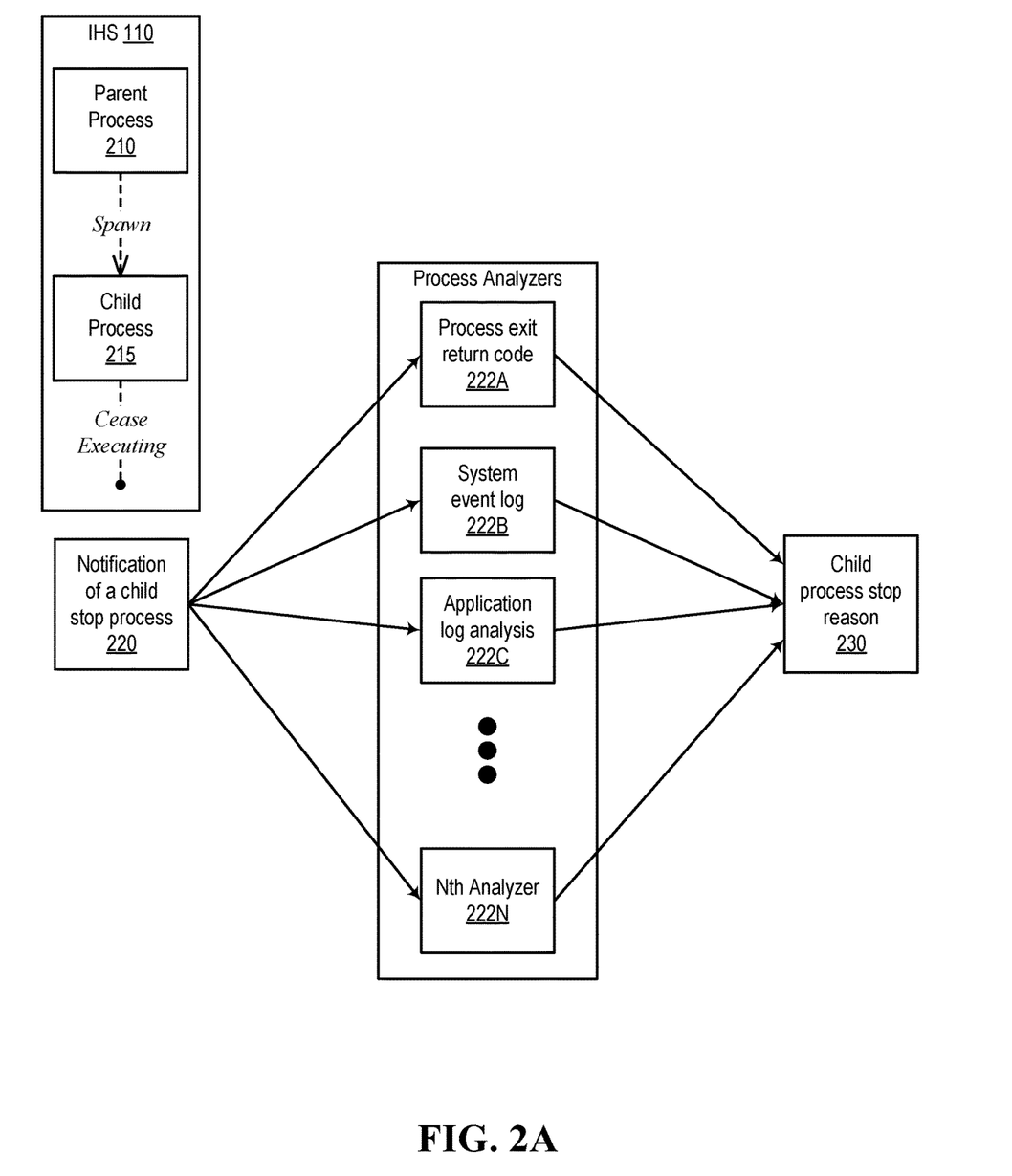
FIG. 2A illustrates an example of categorizing reasons that a child process stopped executing, according to one or more embodiments.

Turning now to FIG. 2A, an example of categorizing reasons that a child process stopped executing is illustrated, according to one or more embodiments. In one or more embodiments, a parent process 210, executing on IHS 110, may spawn (e.g., start) a child process 215. For example, child process 215 may execute on IHS 110. In one or more embodiments, child process 215 may cease executing on IHS 110. In one or more embodiments, a notification 220 of a child stop process may be provided to one or more process analyzers. For example, notification 220 may include a notification received by parent process 210 of child process 215 that stopped executing. For instance, notification 220 may indicate that child process 215 has stopped executing and that parent process 210 was not expecting child process 215 to stop executing. In one or more embodiments, notification 220 may be provided to process analyzers 222A-222N. Although process analyzers 222A-222N are illustrated, any number of process analyzers 222 may be utilized and/or may receive notification 220, according to one or more embodiments. In one or more embodiments, parent process 210 may include process analyzers 222A-222N.

In one or more embodiments, process analyzers 222 may analyze a reason that caused child process 215 to stop executing. In one example, a process analyzer 222A may process an exit return code. For instance, an exit return code may indicate: a command line usage error, a data format error, a cannot open input error, an addressee unknown error, a host name unknown, a service unavailable, internal software error, a system error, a file missing, a cannot open output error, a cannot create output error, a cannot create a file error, a protocol error, a permission denied, or a configuration error, among others. In a second example, a system event log analyzer 222B may process an event log of IHS 110. For instance, system event log analyzer 222B may process the event log of IHS 110 to determine one or more events that occurred before the child process stopped executing. In another example, an application log analysis analyzer 222C may process an application log associated with an application that includes child process 215 that stopped executing or that includes parent process 210. For instance, application log analysis analyzer 222C may process the application log associated with the application to determine one or more events that occurred before child process 215 stopped executing. As an example, application log analysis analyzer 222C may process a diagnostic log produced by child process 215 that stopped executing.

In one or more embodiments, an analyzer 222 may process diagnostic hardware information. For example, an analyzer 222 may process diagnostic hardware information from a time before child process 215 stopped executing to a time when child process 215 stopped executing or to a time after child process 215 stopped executing. For instance, processing the diagnostic hardware information may aid in determining a reason associated with child process 215, which stopped executing. In one or more embodiments, an analyzer 222 may process state information. For example, processing the state information may aid in determining a reason associated with child process 215, which stopped executing. In one or more embodiments, information from process analyzers 222A-222N may be utilized in determining a child process stop reason 230.

Figure 2B:
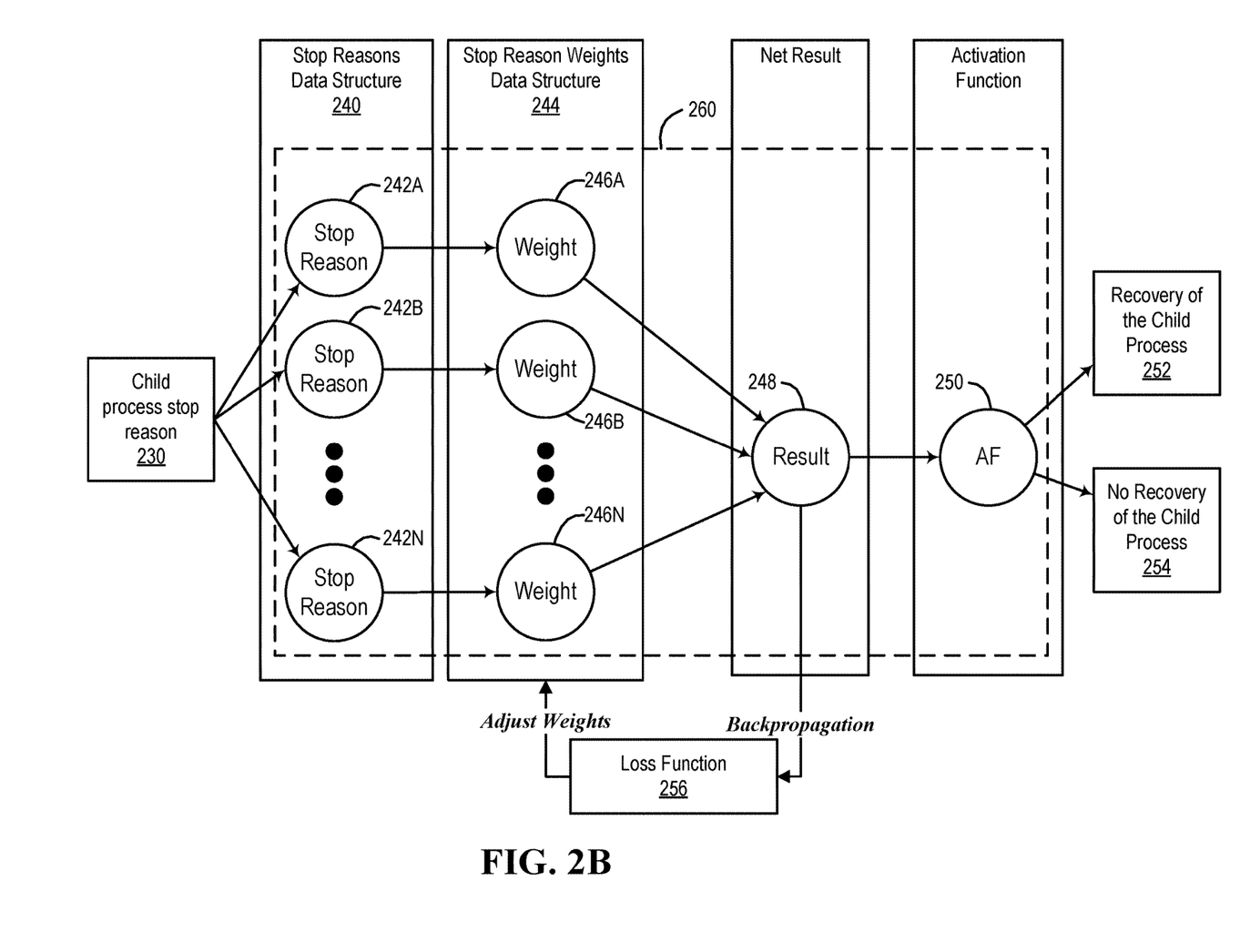
FIG. 2B illustrates a method of managing a child process that stopped executing, according to one or more embodiments.

Turning now to FIG. 2B, a method of managing a child process that stopped executing is illustrated, according to one or more embodiments. In one or more embodiments, child process stop reason 230 may be stored via a stop reasons data structure 240. For example, parent process 210 may store stop reason 230 via data structure 240. For instance, data structure 240 may include one or more of an array, an associative array, a tree, and a table, among others. In one or more embodiments, stop reasons data structure 240 may include stop reasons 242A-242N. Although stop reasons data structure 240 is illustrated as including stop reasons 242A-242N, stop reasons data structure 240 may include any number of stop reasons 242, according to one or more embodiments.

In one or more embodiments, stop reasons 242A-242N may be respectively associated with weights 246A-246N. For example, weights 246A-246N may be stored via a stop reasons weights data structure 244. For instance, data structure 244 may include one or more of an array, an associative array, a tree, and a table, among others. Although stop reasons weights data structure 244 is illustrated as including weights 246A-246N, stop reasons weights data structure 244 may include any number of weights 246, according to one or more embodiments.

In one or more embodiments, a weight 246 may include a numerical value. For example, a weight 246 may include a numerical value from zero (0) to one (1) (e.g., a real number from zero (0) to one (1)). For instance, a sum of weights 246 stored via stop reasons weights data structure 244 may equal one (1). As an example, a sum of weights 246A-246N may equal one (1). In one or more embodiments, stop reasons data structure 240 and stop reasons weights data structure 244 may be combined into a single data structure. For example, the single data structure may include one or more of an array, an associative array, a tree, and a table, among others. In one or more embodiments, stop reasons data structure 240 and stop reasons weights data structure 244 may be stored via another data structure.

In one or more embodiments, if a stop reason 242 occurred, a respective weight 246 may be utilized in determining a net result 248. For example, if stop reason 242B occurred, respective weight 246B may be utilized in determining net result 248. For instance, if stop reason 242B occurred, net result 248 may be weight 246B. In one or more embodiments, if another numerical value is associated with stop reason 242B, the other numerical value may be utilized with weight 246B. For example, the other numerical value may be multiplied by weight 246B. In one or more embodiments, activation function (AF) 250 may determine if net result 248 is above a threshold. If net result 248 is above the threshold, a recovery of the child process 252 may occur. For example, if net result 248 is above the threshold, the child process may be restarted. If net result 248 is not above the threshold, there may be no recovery of the child process 254. For example, if net result 248 is not above the threshold, the child process may not be restarted.

In one or more embodiments, a loss function 256 (which may be sometimes referred to as a cost function) may receive net result 248. For example, a backpropagation process may be utilized. For instance, loss function 256 may adjust one or more of weights 246A-246N. In one or more embodiments, loss function 256 may provide feedback into one or more of weights 246A-246N. For example, the feedback may tune and/or optimize one or more of weights 246A-246N. In one or more embodiments, backpropagation may be utilized in a training an artificial neural network 260. For example, backpropagation may determine a gradient of loss function 256 with respect to weights 246A-246N of neural network 260. In one or more embodiments, utilizing loss function 256 to adjust one or more of weights 246A-246N, neural network 260 may be trained. For example, neural network 260 becomes more trained as neural network 260 learns. For instance, one or more of weights 246A-246N may be adjusted as machine learning proceeds. In one or more embodiments, parent process 210 may include one or more portions of neural network 260. In one or more embodiments, parent process 210 may include neural network 260.

In one or more embodiments, loss function 256 may be configured to utilize any information as input to determine if a stop reason 242 should have a respective weight 246 adjusted. In one example, loss function 256 may be configured to utilize a frequency of child process 215 stopping executing (e.g., a frequency of failure). For instance, the frequency of child process 215 stopping executing may be three minutes or less. In another example, loss function 256 may be configured to utilize prior instances of child process 215 stopping executing (e.g., prior failures). For instance, loss function 256 may determine if a stop reason 242 has occurred again. As an example, loss function 256 may determine if a stop reason 242 has occurred two times or more in a row.

In one or more embodiments, one or more of stop reasons data structure 240 and stop reasons weights data structure 244 may be provided to one or more of IHSs 110A-110N. For example, one or more of stop reasons data structure 240 and stop reasons weights data structure 244 may be provided to one or more of IHSs 110A-110N via network 190. In one instance, one or more of stop reasons data structure 240 and stop reasons weights data structure 244 may be provided to one or more of IHSs 110A-110N after neural network 260 has been trained, or at least partially trained. In another instance, one or more of stop reasons data structure 240 and stop reasons weights data structure 244 may be provided to one or more of IHSs 110A-110N during any point of training neural network 260 or any point of adjusting one or more of weights 246A-246N. In one or more embodiments, one or more of stop reasons data structure 240 and stop reasons weights data structure 244 may be stored via a non-volatile memory medium. For example, one or more of stop reasons data structure 240 and stop reasons weights data structure 244 may be stored via non-volatile memory medium 160.

In one or more embodiments, two or more of IHSs 110A-110N may share one or more of stop reasons data structure 240 and stop reasons weights data structure 244. For example, two or more of IHSs 110A-110N may share one or more of stop reasons data structure 240 and stop reasons weights data structure 244 via network 190. For instance, two or more of IHSs 110A-110N sharing one or more of stop reasons data structure 240 and stop reasons weights data structure 244 may train neural network 260 faster than if a single IHS 110 trained neural network 260. In one or more embodiments, as neural network 260 becomes more trained, a better net result 248 may be determined. For example, when a better net result 248 can be determined, a better determination to restart the child process or not to restart child process 215 may be made. In one or more embodiments, this may improve a performance of IHS 110. For example, if the child process is restarted when it should not be restarted, computing resources (e.g., processor 120, volatile memory medium 150, non-volatile memory medium 150) may be consumed. For instance, when the computing resources are consumed, one or more applications (e.g., one or more of APPs 164-168) and/or an operating system (e.g., OS 162) may take longer to run and/or may not perform as desired by a user.

Figure 3:
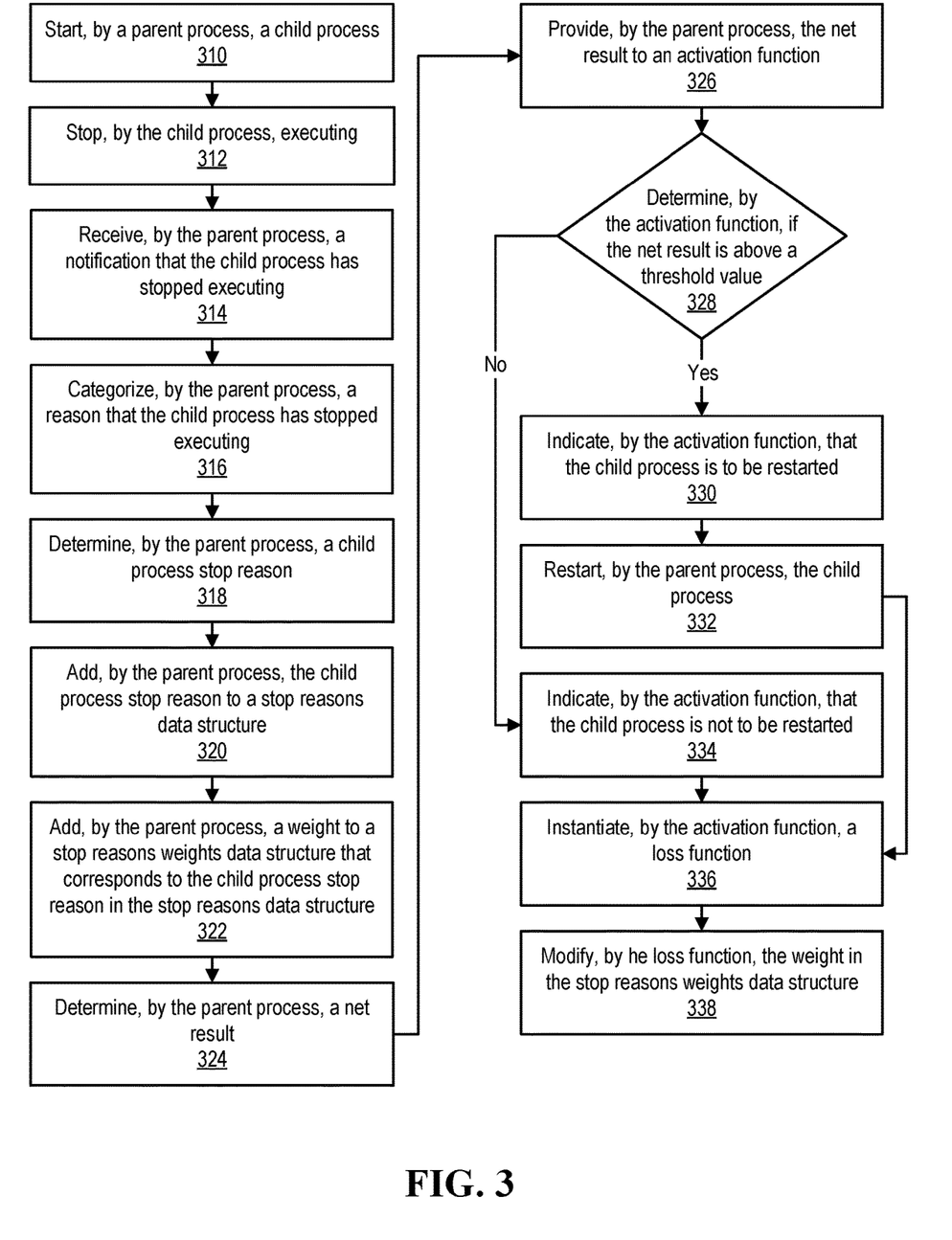
FIG. 3 illustrates an example of managing restarting child processes on an information handling system, according to one or more embodiments.

Turning now to FIG. 3, an example of managing restarting child processes on an information handling system is illustrated, according to one or more embodiments. At 310, a parent process may start a child process. At 312, the child process may stop executing. At 314, the parent process may receive a notification that the child process has stopped executing. At 316, the parent process may categorize a reason that the child process has stopped executing. For example, parent process 210 may categorize the reason that has stopped executing via process analyzers 222A-222N. At 318, the parent process may determine a child process stop reason. For example, parent process 210 may determine child process stop reason 230. For instance, child process stop reason 230 may include information from process analyzers 222A-222N.

At 320, the parent process may add the child process stop reason to a stop reasons data structure. For example, parent process 210 may add the child process stop reason to stop reasons data structure 240. If the child process stop reason is already present in stop reasons data structure 240, the child process stop reason may not be added to stop reasons data structure 240 again. At 322, the parent process may add a weight to a stop reasons weights data structure that corresponds to the child process stop reason in the stop reasons data structure. For example, parent process 210 may add a weight 246 to stop reasons weights data structure 244 that corresponds to child process stop reason 242 in stop reasons data structure 240. For instance, an initial numerical value of a weight 246 may be one (1). At 324, the parent process may determine a net result. For example, parent process 210 may determine net result 248. For instance, parent process 210 may determine net result 248 via the child process stop reason multiplied by the weight corresponding to the child process stop reason. In one or more embodiments, the child process stop reason may be either zero (0) or one (1). For example, for a current child process stop reason, net result 248 may be weight 246 corresponding to the current child process stop reason. In one or more embodiments, the child process stop reason may be one (1). For example, for a current child process stop reason, net result 248 may be weight 246 corresponding to the current child process stop reason.

At 326, the parent process may provide the net result to an activation function. For example, parent process 210 may provide net result 248 to activation function 250. At 328, it may be determined, by the activation function, if the net result is above a threshold value. For example, activation function 250 may determine if the net result is above a threshold value. If the net result is above the threshold value, the activation function may indicate that the child process is to be restarted, at 330. For example, if the net result is above the threshold value, activation function 250 may indicate recovery of the child process 252. At 332, the parent process may restart the child process. For example, parent process 210 may restart child process 215. If the net result is not above the threshold value, the activation function may indicate that the child process is not to be restarted, at 334. For example, if the net result is not above the threshold value, activation function 250 may indicate no recovery of the child process 254. At 336, the activation function may instantiate a loss function. For example, activation function 250 may instantiate loss function 256. At 338, the loss function may modify the weight in the stop reasons weights data structure. For example, loss function 256 may modify weight 246 in stop reasons weights data structure 244.

As an example with seven iterations, a parent process (e.g., parent process 210), which may be monitoring a child process (e.g., child process 215), may receive an indication that the child process has ceased executing (e.g., has crashed) on an information handling system (e.g., IHS 110). A child process stop categorization method may analyze why the child process ceased executing. A child process stop reason may be an "access denied exception". The child process stop categorization method may determine that the child process stop reason of "access denied exception" does not exist, and a new entry is created and a value of one (1) may inserted for the "access denied exception" child process stop reason weight. A net result may be calculated by substituting a value of one (1) for the access denied exception and multiplying it by the access denied exception weight. A determination whether or not to restart the child process may be determined by determining if the net result is above a numerical threshold. For instance, the numerical threshold may be 0.8 (e.g., 80%). In this iteration, the child process stop reason with a numerical value of one (1) multiplied by its associated numerical weight of one (1), which may equal one (1). Accordingly, one (1) is above the numerical threshold, and the child process may be restarted. In this iteration, the loss function may not perform any adjustment to a weight, since no prior child process stop reason has been set. The prior child process stop reason may subsequently set to the "access denied exception".

In a second iteration of the example, the parent process, which is monitoring the child process, may receive an indication that the child process has ceased executing (e.g., has crashed) on the information handling system (e.g., IHS 110). The child process stop categorization method may determine why the child process ceased executing. For instance, the child process stop categorization method may determine that the child process stop reason is the "access denied exception". The child process stop categorization method may determine that the reason of access denied exception" exists or has been utilized. An existing value of one (1) for the assess denied exception weight may be utilized. A net result may be determined by substituting a value of one (1) for the "access denied exception" and multiplying it by the access denied exception weight, which may be one (1). With net result as one (1), which is above the numerical threshold, the child process may be restarted. The loss function may be instantiated. The child process stop reason may be compared to the prior child process stop reason, which may be stored in an in-memory cache, according to one or more embodiments. As the previous child process stop reason matches the current child process stop reason, backpropagation may occur. In this iteration, the prior child process stop reason may be set to the "access denied exception". The child process stop reason of "access denied exception" may have its associated weight adjusted by 0.3 (e.g., 30%). For instance, the child process stop reason of "access denied exception" may have its associated weight adjusted by 0.3 (e.g., 30%). The child process stop reason of "access denied exception" may have its associated weight reduced by 0.3. The access denied exception weight may be updated to be 0.7.

In a third iteration of the example, the parent process, which is monitoring the child process, may receive an indication that the child process has ceased executing (e.g., has crashed) on the information handling system (e.g., IHS 110). The child process stop categorization method may determine why the child process ceased executing. For instance, the child process stop categorization method may determine that the child process stop reason is the "access denied exception". The child process stop categorization method may determine that the "access denied exception" reason exists or has been utilized. The "access denied exception" weight may be 0.7. A net result may be determined by substituting a value of one (1) for the "access denied exception" and multiplying it by the access denied exception weight, which may be 0.7. With the net result as 0.7, which is not above the numerical threshold, the child process may not be restarted. The loss function may be instantiated. The child process stop reason may be compared to the prior child process stop reason, which may be stored in an in-memory cache, according to one or more embodiments. As the previous child process stop reason matches the current child process stop reason, backpropagation may occur. In this iteration, the prior child process stop reason may be set to the "access denied exception". The child process stop reason of "access denied exception" may have its associated weight adjusted to be 0.49. For instance, the access denied exception weight of 0.7 may be multiplied by 0.7.

In a fourth iteration of the example, another process or a user may start the child process. In a fifth iteration of the example, the parent process, which is monitoring the child process, may receive an indication that the child process has ceased executing (e.g., has crashed) on the information handling system (e.g., IHS 110). The child process stop categorization method may determine why the child process ceased executing. For instance, the child process stop categorization method may determine that the child process stop reason is the "invalid operation exception". The child process stop categorization method may determine that the "invalid operation exception" reason does not exist or has not been utilized. The "invalid operation exception" weight may be one (1). A net result may be calculated by substituting a value of one (1) for the access denied exception and multiplying it by the access denied exception weight. A determination whether or not to restart the child process may be determined by determining if the net result is above the numerical threshold. In this iteration, the child process stop reason with a numerical value of one (1) multiplied by its associated numerical weight of one (1) is one (1). Accordingly, one (1) is above the numerical threshold, and the child process may be restarted. In this iteration, the loss function may be instantiated. The child process stop reason may be compared to the prior child process stop reason, which may be stored in an in-memory cache, according to one or more embodiments. As the two child process stop reasons do not match, backpropagation may not occur. For instance, since the reason "access denied exception" does not match the reason "invalid operation exception", backpropagation may not occur. The prior child process stop reason is set to the "invalid operation exception" reason.

In a sixth iteration of the example, the information handling system (e.g., IHS 110) may be rebooted. After the information handling system reboots, the parent process may start the child process. In a seventh iteration of the example, the parent process, which is monitoring the child process, may receive an indication that the child process has ceased executing (e.g., has crashed) on the information handling system (e.g., IHS 110). The child process stop categorization method may determine why the child process ceased executing. For instance, the child process stop categorization method may determine that the child process stop reason is the "access denied exception". The child process stop categorization method may determine that the "access denied exception" reason exists or has been utilized. The "access denied exception" weight may be 0.49. A net result may be determined by substituting a value of one (1) for the "access denied exception" and multiplying it by the access denied exception weight, which may be 0.49. With the net result as 0.49, which is not above the numerical threshold, the child process may not be restarted. The loss function may be instantiated. In this iteration, the loss function may not perform any adjustment to a weight, since no prior child process stop reason has been set. The prior child process stop reason may subsequently set to the "access denied exception".

Figure 4:
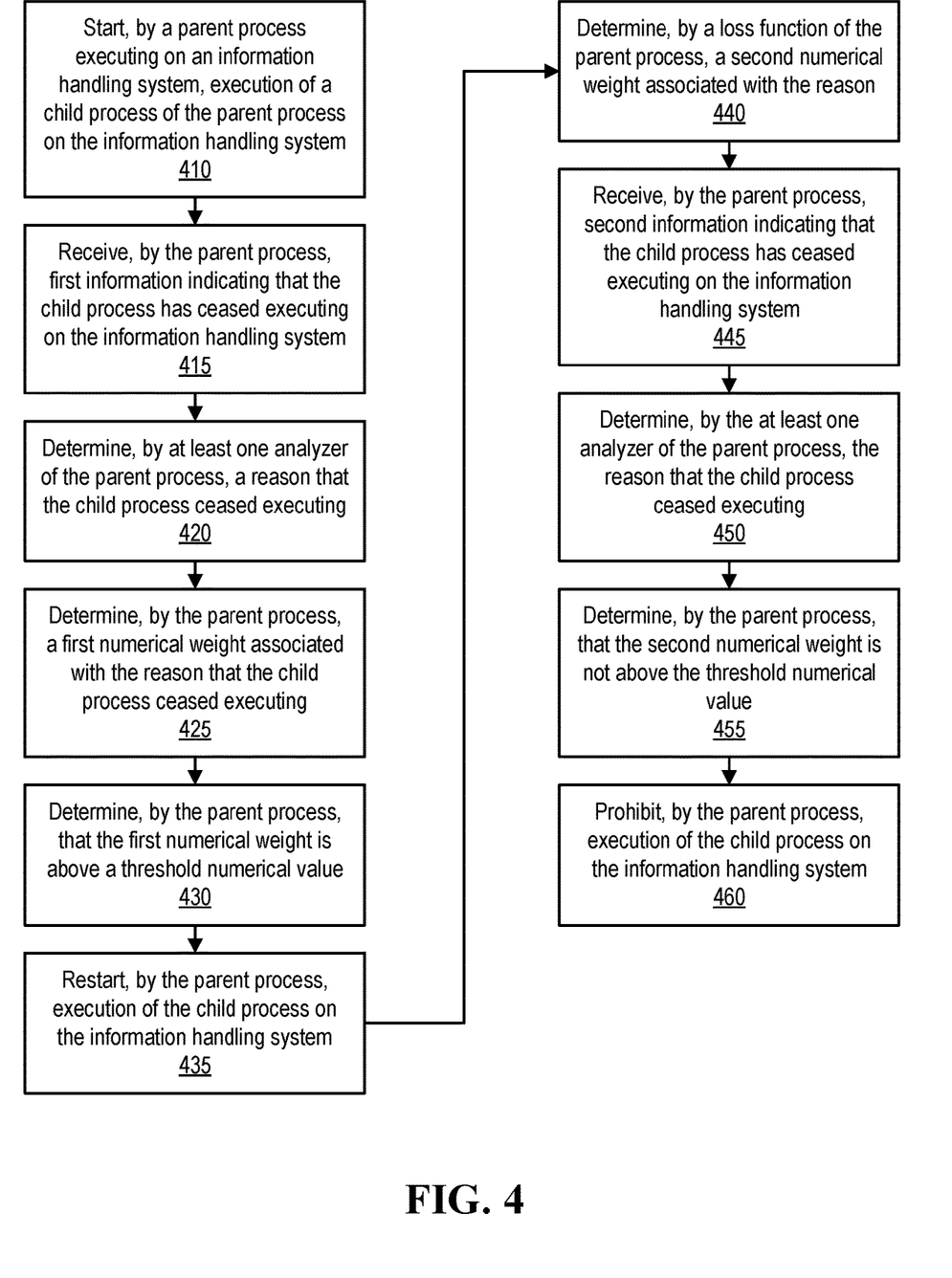
FIG. 4 illustrates another example of managing restarting child processes on an information handling system, according to one or more embodiments.

Turning now to FIG. 4, another example of managing restarting child processes on an information handling system is illustrated, according to one or more embodiments. At 410, a parent process executing on an information handling system may start execution of a child process of the parent process on the information handling system. For example, parent process 210 executing on IHS 110 may start execution of child process 215 of parent process 210 on the information handling system. At 415, the parent process may receive first information indicating that the child process has ceased executing on the information handling system. For example, parent process 210 may receive first information indicating that child process 215 has ceased executing on IHS 110. At 420, at least one analyzer of the parent process may determine a reason that the child process ceased executing. For example, at least one analyzer 222 of parent process 210 may determine a reason 230 that child process 215 ceased executing.

At 425, the parent process may determine a first numerical weight associated with the reason that the child process ceased executing. For example, parent process 210 may determine a first numerical weight associated with the reason that child process 215 ceased executing. At 430, the parent process may determine that the first numerical weight is above a threshold numerical value. For example, parent process 210 may determine that the first numerical weight is above a threshold numerical value. For instance, activation function 250 of parent process 210 may determine that the first numerical weight is above a threshold numerical value. At 435, the parent process may restart execution of the child process on the information handling system. For example, parent process 210 may restart execution of child process 215 on IHS 110. For instance, parent process 210 may recover child process 215. In one or more embodiments, restarting execution of the child process on the information handling system may be performed in response to determining that the first numerical weight is above the threshold numerical value.

At 440, a loss function of the parent process may determine a second numerical weight associated with the reason. For example, loss function 256 of parent process 210 may determine a second numerical weight associated with the reason. For instance, the second numerical weight may be less than the first numerical weight. In one or more embodiments, loss function 256 of parent process 210 may determine a second numerical weight associated with the reason based at least on a previous restart of child process 215. At 445, the parent process may receive second information indicating that the child process has ceased executing on the information handling system. For example, parent process 210 may receive second information indicating that child process 215 has ceased executing on IHS 110.

At 450, the at least one analyzer of the parent process may determine the reason that the child process ceased executing. For example, the at least one analyzer 222 of parent process 210 may determine the reason that child process 215 ceased executing. At 455, the parent process may determine that the second numerical weight is not above the threshold numerical value. For example, parent process 210 may determine that the second numerical weight is not above the threshold numerical value. At 460, the parent process may prohibit execution of the child process on the information handling system. For example, parent process 210 may prohibit execution of child process 215 on IHS 110. In one or more embodiments, prohibiting execution of the child process on the information handling system may be performed in response to determining that the second numerical weight is not above the threshold numerical value. In one or more embodiments, the loss function may provide feedback to the parent process. For example, determining to prohibit execution of the child process on the information handling system may be based at least on the feedback to the parent process.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system to:
   start, by a parent process executing on the information handling system, execution of a child process of the parent process on the information handling system;
   receive, by the parent process, first information indicating that the child process has ceased executing on the information handling system;
   determine, by at least one analyzer of the parent process, a reason that the child process ceased executing;
   determine, by the parent process, a first numerical weight associated with the reason that the child process ceased executing;
   determine, by the parent process, that the first numerical weight is above a threshold numerical value;
   in response to determining that the first numerical weight is above the threshold numerical value, restart, by the parent process, execution of the child process on the information handling system;
   determine, by a loss function of the parent process, a second numerical weight associated with the reason;
   receive, by the parent process, second information indicating that the child process has ceased executing on the information handling system;
   determine, by the at least one analyzer of the parent process, the reason that the child process ceased executing;
   determine, by the parent process, that the second numerical weight is not above the threshold numerical value; and
   in response to determining that the second numerical weight is not above the threshold numerical value, prohibit, by the parent process, execution of the child process on the information handling system.

2. The information handling system of claim 1, wherein the at least one analyzer of the parent is configured to process diagnostic hardware information associated with the child process ceasing executing on the information handling system.

3. The information handling system of claim 2, wherein, to process the diagnostic hardware information associated with the child process ceasing executing on the information handling system, the at least one analyzer of the parent is further configured to process the diagnostic hardware information from a time before the child process stopped executing to at least one of a time when the child process stopped executing and a time after the child process stopped executing.

4. The information handling system of claim 1, wherein the at least one analyzer of the parent is configured to process state information associated with the information handling system.

5. The information handling system of claim 1, wherein the instructions further cause the information handling system to:
   determine, by a backpropagation process, the second numerical weight associated with the reason;
   wherein the backpropagation process includes the loss function.

6. The information handling system of claim 1, wherein the instructions further cause the information handling system to:
   provide, by the parent process, the reason that the child process ceased executing to at least one other information handling system via a network; and
   provide, by the parent process, at least one of the first numerical weight associated with the reason and the second numerical weight associated with the reason via the network.

7. The information handling system of claim 1, further comprising:
   a volatile memory medium;
   wherein the instructions further cause the information handling system to store the reason that the child process ceased executing via the volatile memory medium.

8. A method, comprising:
   starting, by a parent process executing on an information handling system, execution of a child process of the parent process on the information handling system;

receiving, by the parent process, first information indicating that the child process has ceased executing on the information handling system;

determining, by at least one analyzer of the parent process, a reason that the child process ceased executing;

determining, by the parent process, a first numerical weight associated with the reason that the child process ceased executing;

determining, by the parent process, that the first numerical weight is above a threshold numerical value;

in response to the determining that the first numerical weight is above the threshold numerical value, restarting, by the parent process, execution of the child process on the information handling system;

determining, by a loss function of the parent process, a second numerical weight associated with the reason;

receiving, by the parent process, second information indicating that the child process has ceased executing on the information handling system;

determining, by the at least one analyzer of the parent process, the reason that the child process ceased executing;

determining, by the parent process, that the second numerical weight is not above the threshold numerical value; and in response to the determining that the second numerical weight is not above the threshold numerical value, prohibiting, by the parent process, execution of the child process on the information handling system.

9. The method of claim 8, wherein the at least one analyzer of the parent is configured to process is configured to process diagnostic hardware information associated with the child process ceasing executing on the information handling system.

10. The method of claim 9, wherein, to process the diagnostic hardware information associated with the child process ceasing executing on the information handling system, the at least one analyzer of the parent is further configured to process the diagnostic hardware information from a time before the child process stopped executing to at least one of a time when the child process stopped executing and a time after the child process stopped executing.

11. The method of claim 8, wherein the at least one analyzer of the parent is configured to process state information associated with the information handling system.

12. The method of claim 8, further comprising:
determining, by a backpropagation process, the second numerical weight associated with the reason;
wherein the backpropagation process includes the loss function.

13. The method of claim 8, further comprising:
providing, by the parent process, the reason that the child process ceased executing to at least one other information handling system via a network; and
providing, by the parent process, at least one of the first numerical weight associated with the reason and the second numerical weight associated with the reason via the network.

14. The method of claim 8, further comprising:
storing the reason that the child process ceased executing via a volatile memory medium of the information handling system.

15. A computer-readable non-transitory memory medium that includes instructions that, when executed by at least one processor of an information handling system, cause the information handling system to:

start, by a parent process executing on the information handling system, execution of a child process of the parent process on the information handling system;

receive, by the parent process, first information indicating that the child process has ceased executing on the information handling system;

determine, by at least one analyzer of the parent process, a reason that the child process ceased executing;

determine, by the parent process, a first numerical weight associated with the reason that the child process ceased executing;

determine, by the parent process, that the first numerical weight is above a threshold numerical value;

in response to determining that the first numerical weight is above the threshold numerical value, restart, by the parent process, execution of the child process on the information handling system;

determine, by a loss function of the parent process, a second numerical weight associated with the reason;

receive, by the parent process, second information indicating that the child process has ceased executing on the information handling system;

determine, by the at least one analyzer of the parent process, the reason that the child process ceased executing;

determine, by the parent process, that the second numerical weight is not above the threshold numerical value; and in response to determining that the second numerical weight is not above the threshold numerical value, prohibit, by the parent process, execution of the child process on the information handling system.

16. The computer-readable non-transitory memory medium of claim 15, wherein the at least one analyzer of the parent is configured to process diagnostic hardware information associated with the child process ceasing executing on the information handling system.

17. The computer-readable non-transitory memory medium of claim 16, wherein, to process the diagnostic hardware information associated with the child process ceasing executing on the information handling system, the at least one analyzer of the parent is further configured to process the diagnostic hardware information from a time before the child process stopped executing to at least one of a time when the child process stopped executing and a time after the child process stopped executing.

18. The computer-readable non-transitory memory medium of claim 15, wherein the at least one analyzer of the parent is configured to process state information associated with the information handling system.

19. The computer-readable non-transitory memory medium of claim 15, wherein the instructions further cause the information handling system to:
determine, by a backpropagation process, the second numerical weight associated with the reason;
wherein the backpropagation process includes the loss function.

20. The computer-readable non-transitory memory medium of claim 15, wherein the instructions further cause the information handling system to:
provide, by the parent process, the reason that the child process ceased executing to at least one other information handling system via a network; and
provide, by the parent process, at least one of the first numerical weight associated with the reason and the second numerical weight associated with the reason via the network.

* * * * *